March 29, 1966 D. A. DOYLE 3,243,553
MODULATING THERMOSTAT WITH POSITIVE ACTION ELECTRICAL CONTACTS
Filed July 10, 1963 3 Sheets-Sheet 3

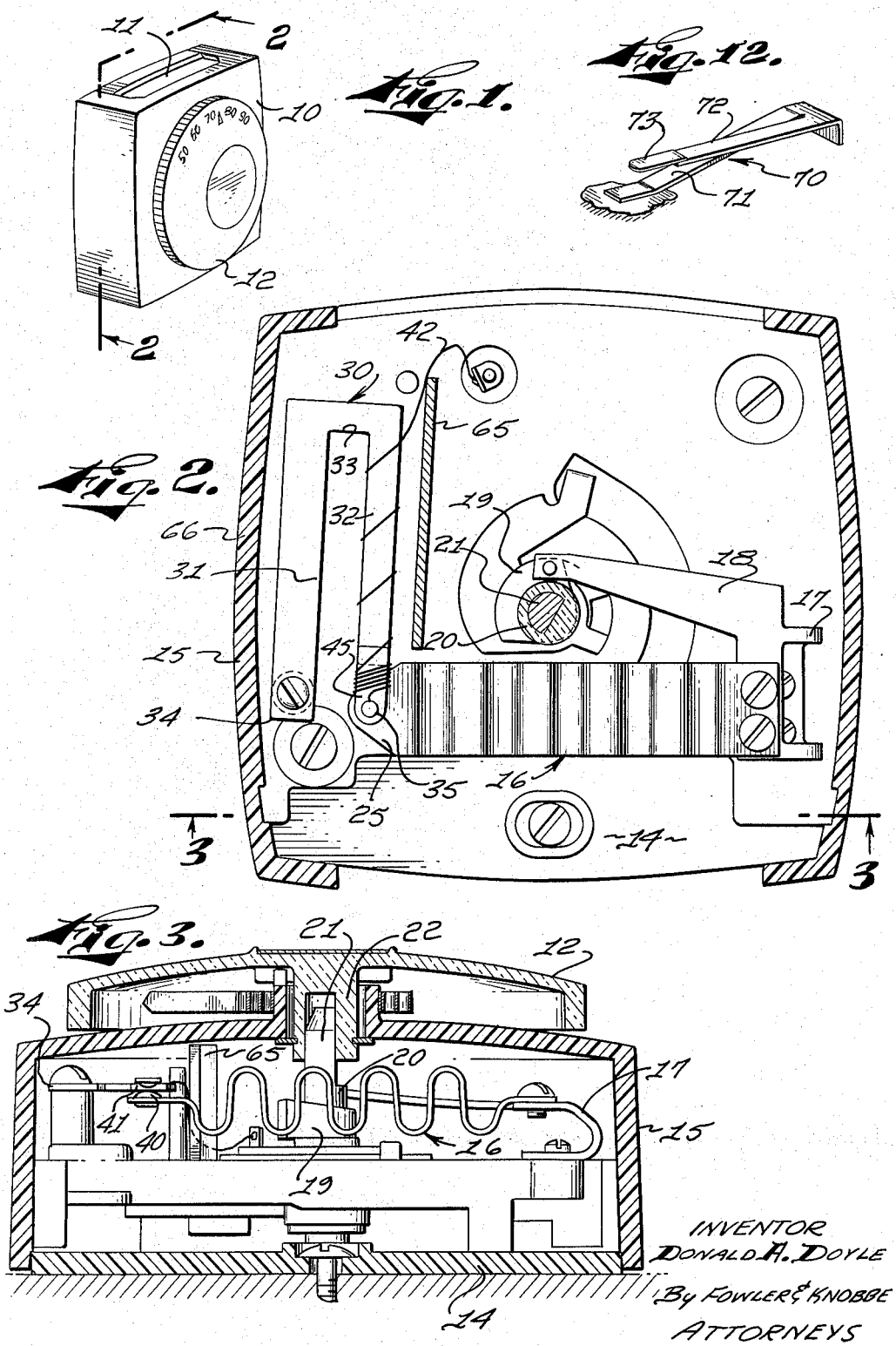

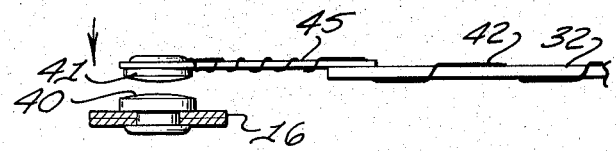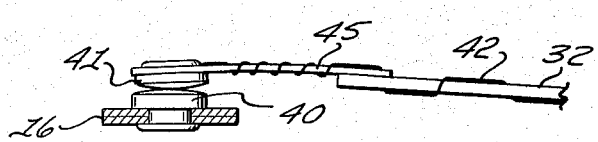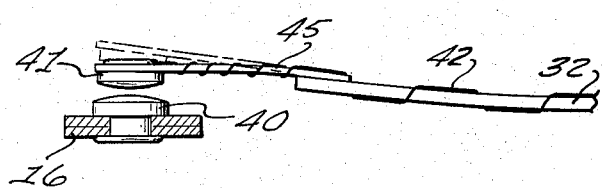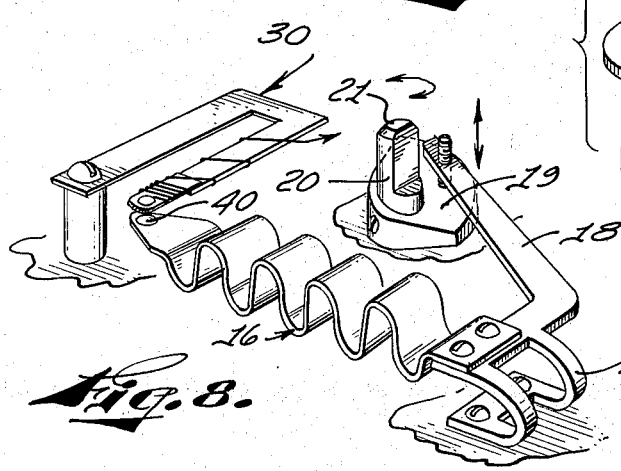

INVENTOR
DONALD A. DOYLE
By FOWLER & KNOBBE
ATTORNEYS

United States Patent Office 3,243,553
Patented Mar. 29, 1966

3,243,553
MODULATING THERMOSTAT WITH POSITIVE
ACTION ELECTRICAL CONTACTS
Donald A. Doyle, Santa Ana, Calif., assignor to Robertshaw Controls Company, Richmond, Va., a corporation of Delaware
Filed July 10, 1963, Ser. No. 294,077
18 Claims. (Cl. 200—122)

The present invention relates to an improved modulating thermostat for supplying a variable electrical signal proportional to the difference between the existing ambient temperature and the desired control temperature. More particularly, this invention relates to an improved modulating thermostat employing bimetal temperature sensing elements.

The most typical and least expensive domestic heating systems employ bimetal temperature sensing elements actuating an electrical switching mechanism. These thermostats make use of the warping or flexing action of the bimetal to actuate the switching means to either of two stable conditions, namely open or closed. This action in turn causes the furnace to be full ON or full OFF. It is well known that such systems cause uncomfortable temperature fluctuations to the occupants, especially under the conditions of relatively mild outdoor temperature and associated low heat losses from the home. Thus, the furnace must be capable of supplying enough heat energy to equal the heat loss of the home under the most severe temperature conditions. However, under milder outdoor temperatures, the same furnace will supply heat when full ON at a rate in excess of the actual losses of the home. The thermal inertia of the system under these conditions causes wide and uncomfortable temperature fluctuations.

A more desirable control system is one in which the rate of heat generation in the furnace is infinitely variable between some minimum rate and the full rated capacity of the furnace, and where the rate of heating supplied to the home is controlled to be just equal the heat loss and thus result in a constant temperature in the controlled area. This type of furnace is presently available, e.g. gas furnaces with modulated gas control valves. Heretofore, however, a modulating thermostat has not been available which is inexpensive enough to be economically feasible for the average homeowner and yet which has sufficient reliability to give trouble-free operation.

One basic requirement for any remote modulating thermostat is that it must supply an electrical signal which is infinitely variable over some suitable range and that it be able to apply this variable signal in response to an infinite number of temperature conditions between some suitably small temperature limits, such as 2 to 4° F. A further basic requirement is that it must be capable of adjustment to control at any desired control band within some suitable controllable range, such as between 55 and 90° F.

One type of contemporary modulating thermostat employs thermosensitive electrical components such as thermistors to obtain an infinitely variable electrical signal as a function of room temperature. These thermal elements cannot, however, control the furnace directly since they can only handle small electrical currents without an appreciable self-heating effect and an associated loss in ambient temperature sensitivity. Accordingly, their signal must be amplified by the use of transistors, thyratron tubes, silicon controlled rectifiers and the like, to develop a controlled signal of sufficient power to control the modulating gas valve or analogous furnace component. A preferred system employing silicon controlled rectifiers is described in a copending application of William W. Chambers entitled "Temperature Control Circuit," Serial No. 314,585, filed October 2, 1963 and assigned to Robertshaw Controls Co., assignee of the present invention. In the present state of the electronic art, however, these electronic components are relatively expensive.

Another prior art modulating thermostat employs a pulsing or self-cycling electrical contact member to automatically make and break the electrical circuit to the furnace and thus divide the electrical power in alternate on and off periods such that the percentage on time is infinitely variable between suitable limits as a function of the position of the ambient sensor. A specific form of this type of system is known in the art as a copy-sensor system in which the sensing element is warped according to the ambient temperature and a self powered cycling member oscillates back and forth sensing the position of the ambient sensor. An early embodiment of this type of thermostat is shown in U.S. Patent No. 1,885,050— Smulski. Later systems embodying this type of thermostat are shown in U.S. Patents 2,052,536—Hivers and 2,285,913—Derrah. This type of thermostat has had heretofore the serious disadvantage that the contacts are slow to make and break with resultant rapid deleterious contact wear. By way of specific example, these prior art thermostats constructed in a manner suitable for controlling a home furnace have been found to suffer appreciable contact damage when operated for only a single day.

Another type of prior art system, such as shown by U.S. Patent 3,025,484—Cunningham, has used a partially liquid-filled bellows as a temperature transducer to provide mechanical motion proportional to room temperature. This mechanical motion may operate a sliding contact along a resistant winding thereby changing the circuit resistance and providing a proportional output electrical signal. The thermal lag of a bellows type sensor and the fact that a finite amount of mechanical work must be performed by the sensing element combine to limit the overall sensitivity of this system, especially to small or sudden room temperature changes.

It is an object of the present invention to provide an improved modulating thermostat which is inexpensive enough to be economically feasible for the average home owner and preferably in the same cost range as the contemporary bimetal on-off thermostat.

Another object of this invention is to provide a modulating thermostat incorporating means for obtaining positive action of the electrical contacts so as to insure long life and accurate repeatability.

It is a further object of the present invention to provide a modulating thermostat having increased convection circulation of ambient air therethrough.

Still another object of this invention is to provide a modulating thermostat which produces an electrical signal proportional to the difference in room air temperature and the set maximum controlled temperature, this thermostat having sufficient magnitude to operate a suitable modulating gas valve directly without the necessity of intermediate amplification means.

Other and further objects, features and advantages of the invention will become apparent as the description proceeds.

The present invention comprises an improved thermostat of the sensor-copy type described hereinabove. A bimetal ambient sensing element and an ambient compensated bimetal "copy" or position sensing element carry respective switch contacts for energizing an electrical heater thermally associated with a portion only of the ambient compensated element. This portion of the ambient compensated element comprises respective fast and slow temperature responsive segments which flex in respectively opposite directions thereby effecting positive action between the electrical contacts. Thus, with one of the electrical contacts affixed to the fast-acting bimetal section, this rapid flexing section increases contact closure when the contacts close and increases the contact gap on contact opening (following energization of the local electrical heater). As a result, a very fast contact make and break is achieved thereby greatly decreasing contact wear.

Briefly, in accordance with a preferred embodiment of the present invention, the ambient sensing thermostat comprises a corrugated configuration allowing free circulation of ambient air to all sections thereof. The ambient compensated bimetal element includes an elongated portion and a much shorter reversed tip made of substantially thinner bimetal than that used for the elongated portion. The local heater preferably comprises an insulated resistance wire wound directly around both the elongated portion and tip portion, with more turns per unit length being applied around the reversed tip section than around the elongated portion. The combination of the thin bimetal and increased resistance heating causes the tip portion to flex substantially faster than the elongated bimetal section.

A more thorough understanding of the invention may be obtained by a study of the following detailed description taken in connection with the accompanying drawings in which:

FIG. 1 is a perspective view of an illustrative embodiment of the invention;

FIG. 2 is a cross-sectional view taken along the line 2—2 of FIG. 1;

FIG. 3 is a sectional view taken along the line 3—3 of FIG. 2;

Figure 9:
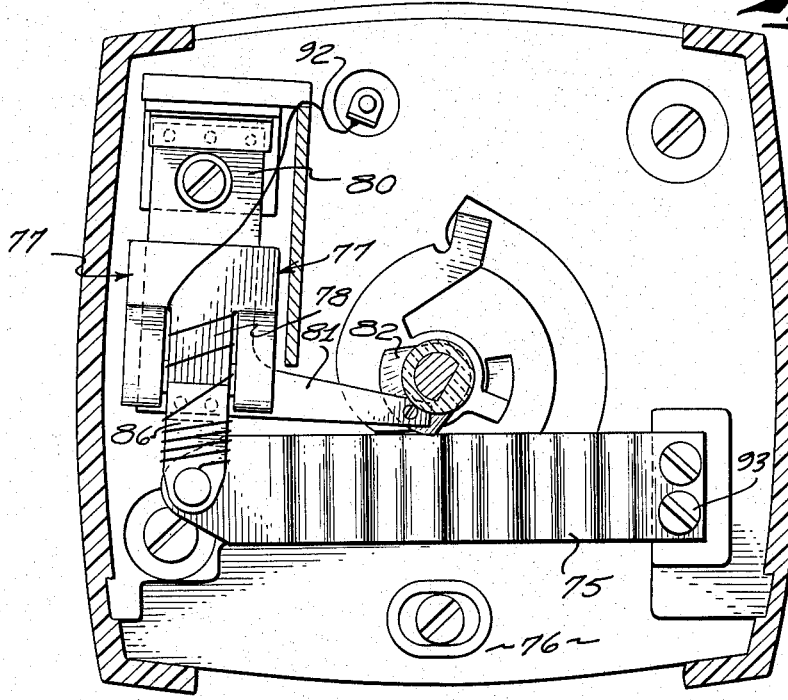
Figure 11:
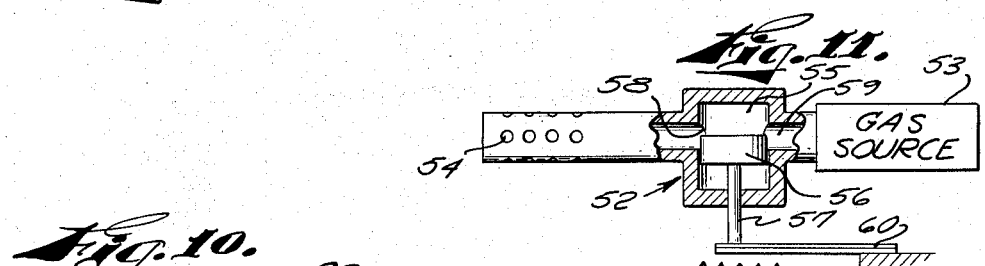
Figure 10:
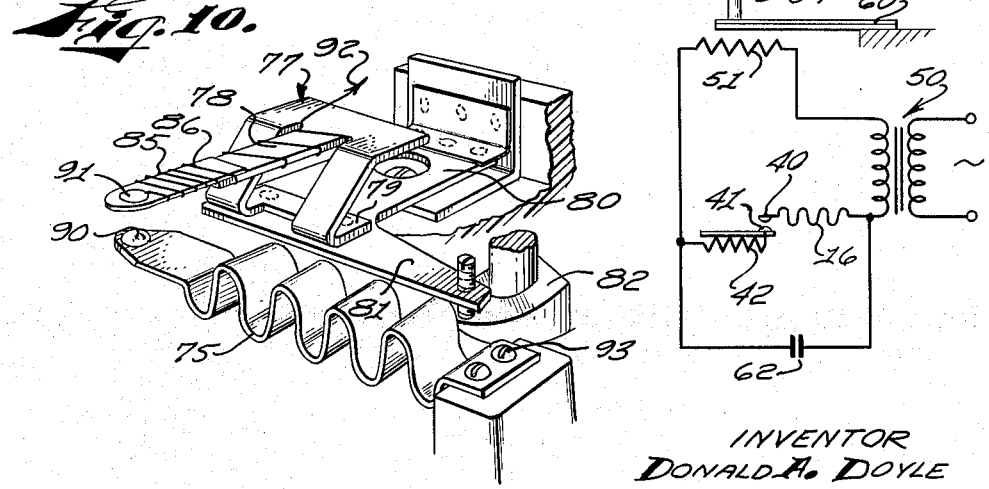

FIGS. 4, 5, and 6 illustrate the operation of the ambient sensing bimetal and position sensing bimetal elements;

FIG. 7 is an enlarged perspective view of the tip portion of the follower bimetal element;

FIG. 8 is a perspective view of the internal structure of the embodiment shown in FIGS. 2 and 3;

FIG. 9 is a cross-sectional view of an alternative embodiment of a modulating thermostat constructed in accordance with the present invention;

FIG. 10 is a perspective view of the internal structure of the embodiment shown in FIG. 9;

FIG. 11 is a schematic circuit showing a typical operational mode wherein a thermostat constructed in accordance with this invention controls a gas furnace; and FIG. 12 illustrates an alternative embodiment of the ambient compensated element.

Referring now to FIG. 1, the external appearance of a modulating thermostat constructed in accordance with this invention may be subsantially identical to that of the prior art ON-OFF thermostats. As shown, a housing 10 is provided with an opening 11 at the top and at the bottom (not shown) for facilitating contact of the ambient sensing element with the ambient air and facilitating removal of the heat generated by the local electrical heater. A control knob 12 graduated in degrees may be rotated for selecting a predesired control or set temperature.

The internal structure of a preferred embodiment constructed in accordance with the invention is illustrated in detail in FIGS. 2, 3, 7 and 8. Housing 10 preferably comprises a base or mounting platform 14 and a cover member 15. An ambient sensitive member 16 is supported upon the base 14 and preferably comprises a corrugated bimetal member supported in cantilever fashion by a resilient, generally U-shaped pivot member 17. Member 17 include an integral extending segment 18 biased in the downward direction for maintaining it in mechanical contact with an adjusting cam 19. This cam and extending shaft 20 are rotatably mounted upon the base 14.

Shaft 20 includes an extending semicircular portion 21 for engagement with a depending boss 22 integral with the temperature select knob 12. Accordingly, as the temperature select knob 12 is rotated, the segment 18 and in turn the ambient sensing element 16 is moved in either an upward or downward direction with respect to the base 14. The position of the tip end 25 of the bimetal element 16 is moved in either an upward or downward direction with respect to the base 14. The position of the tip end 25 of the bimetal element 16 is thus determined by the position of the cam 19 and the flexure of the member 16 in response to the ambient temperature.

The position of the tip end 25 of the ambient sensor 16 is sensed by cycling bimetal member 30. One configuration shown in FIGS. 2, 3 and 8 comprises an ambient compensated thermostatic element formed by a generally U-shaped member having two bimetal legs 31, 32 and a connecting section 33. As is well known in the art, if the tip end 34 of leg 32 is fixedly mounted to the base 14 as shown in FIG. 3, the tip end 35 of the other leg will remain fixed in space when the unit is subjected to ambient changes. If, however, heat is applied preferentially to leg 32, the position of tip end 35 can be moved relative to the base 14 independent of changes in ambient temperature.

A pair of electrical switch contacts 40, 41 are respectively carried by the ambient sensor 16 and the position sensing member 30. Contact 41 is electrically connected to a bared end of an electrical resistance wire 42 wound upon the preferentially heated bimetal leg 32 (FIG. 7). Closing of the contacts 40, 41 completes an electrical circuit through the resistance wire 42. The end of lead 42 and a lead attached to the conductive pivot 17 constitute the output terminals of the thermostat.

Leg 32 flexes away from bimetal 16 to open switch contacts 40, 41 upon preferential heating thereof by current flow through wire 42. Subsequent cooling of leg 32 causes the contacts 40, 41 to again close. As a result, the ON time (when the contacts are closed) is directly proportional to the ambient sensor position which in turn is proportional to the temperature differential between the ambient sensor and the desired set temperature.

A significant feature of the present invention is the provision of a means for obtaining positive action of the electrical contacts for obtaining long contact life and accurate repeatability. This means comprises a thin bimetal tip 45 attached by welding or other suitable means to the end of leg 32 of the ambient compensated element 30. This tip portion is reversedly juxtaposed the leg 32, that is, the metal having the greater temperature coefficient of expansion is located on the upper surface of the tip 45 whereas the metal having the greater temperature coefficient of expansion is located upon the lower surface of the leg 32. In addition, more turns of the resistance heater wire 42 per unit length are wound upon the tip portion 45 than upon the leg 32. This combined additional local heating and thinner bimetal provides the position sensor with a very fast temperature responsive tip portion 45 and a relatively slow temperature responsive portion (elongated leg 32).

The operation of the reversed tip portion for achieving greatly improved contact action is illustrated in FIGS. 4, 5 and 6. In the following description, the ambient sensor 16 will have been presumed to have assumed a position dictated by the setting of cam 19 and the temperature of the ambient air in the manner described hereinabove. Referring now to FIG. 4, leg 32 of the ambient compensated element and tip 45 are shown after having been preferentially heated by the resistance heater winding 42. As shown, the contacts 40, 41 are open so that the local heating has ceased and the leg and tip are moving downwardly to close the contact gap. In FIG. 5, the contacts are shown a short time after they have closed. The elongated leg portion 32 has begun to warp in an upward direction whereas the tip portion 45 has moved quickly downward, thereby increasing the contact force between the contacts 40–41. However, since the leg 32 is much longer than the tip 45, it will cause the contact 41 to move away and break contact with contact 40. Again, the tip 45 responds faster than the leg 32 and will move quickly upwardly as shown by the dotted lines of FIG. 6, thereby increasing the gap at the contacts. Accordingly, the contact actuation is very fast, both upon closing the contacts and opening thereof with the tip portion having the overall effect of providing positive action to these electrical contacts; that is, on contact closing, it moves to increase the closure thereof, and upon contact opening, it moves to increase the opening gap between the contacts.

It will be seen from FIGS. 4, 5 and 6 that if the ambient sensor should sense a further decrease in temperature, it will move further upward. This has the effect of increasing the ON time of the contact cycle since leg 32 must attain a higher temperature before it can break contacts 40, 41. It is obvious that while the ON time increases, the OFF time decreases, thus providing a greatly increased average ON time. This average ON time can be varied from 0% to 100% as a function of the sensor position, the percentage of ON time being proportional to the temperature differential between the ambient and the desired set temperature.

A representative application of the modulating thermostat of this invention is illustrated in FIG. 11 wherein the resistance winding 42, contacts 40, 41 and ambient sensor 16 are connected in series with the secondary winding of an alternating current transformer 50. This transformer is generally a step-down transformer with its primary connected to the line potential. The temperature regulating system is therefore a low voltage system connected to drive a resistance heater 51 included in a modulating gas valve 52 shown schematically in FIG. 11. A preferred gas valve of this type is illustrated in the copending application of Roy W. Houser, Serial No. 279,572, filed May 10, 1963 and assigned to Robertshaw Controls Company, assignee of the present invention.

Gas control valve 52 is connected between gas source 53 and the burner 54 which may be an ordinary furnace burner. The valve 52 includes a cylindrical chamber 55 in which a piston 56 is slidably mounted upon shaft 57. Movement of the piston 56 within the chamber varies of the restriction of the valve ports 58, 59 thereby varying the amount of gas supplied the burner 54 from the gas source 53. Piston 56 is actuated by a bimetallic cantilever member 60 located proximate the heater resistance 51. The amount that the piston is displaced so as to uncover the ports 58, 59 is proportional to the amount of current flowing through the heater 51. Accordingly, the amount of gas delivered to the burner 54 is proportional to the ON time of the contacts 40, 41 of the modulating thermostat.

FIG. 11 further illustrates means for improving the operation of the modulating thermostat comprising a capacitor 63 connected across the contacts 40, 41. It has been found that the capacitor materially improves the contact action, e.g. without the capacitor, the contact make and break times are as high as ⅓ of a second whereas, with the capacitor, the contact action occurs within ¹⁄₁₀ of a second or less. Moreover, the capacitor 63 substantially reduces radio frequency interference.

Referring again to FIGS. 2 and 3, there is shown structure therein for increasing the accuracy of the modulating thermostat by effecting increased convection circulation of ambient air through the thermostat and rapid removal of the heat produced by the local electrical heater 42. This advantageous operation is achieved by a heat shield member 65 located proximate leg 32 of the position sensing element 30 and formed generally parallel to the end wall 66 of the cover 15. This heat shield 65 is preferably fixedly mounted to the base 14 as shown in FIG. 3 and extends closely adjacent the inner surface of the cover 15. As a result, a vertical chamber is formed around the preferentially heated bimetal element 30 by the base 14, the cover 15 and the shield 65, thereby causing an upward flow of air by virtue of the chimney effect.

Another advantage of modulating thermostats constructed in accordance with this invention is their inherent voltage compensation. It is well known that line voltages may vary from one locality to another and even at a single location at times of changing demands on the local electrical distribution system. Since the thermostat described is basically a wattage operated device, that is a particular wattage must be delivered in the form of heat to the bimetal leg 32 to cause opening of the contacts, if the line voltage should decrease, the contacts will remain closed for a longer period of time before sufficient heat is developed to cause them to open. Since the heater 51 of the gas valve is also a wattage sensitive device, it will also experience a longer energized period, but at the lower heating rate since energized from the same alternating current source as the thermostat. Therefore, the average wattage delivered to the modulating gas valve over any given number of cycles or periods of time will be substantially independent of line voltage variations.

Another feature of the invention is that the ambient sensing bimetal element 16 is completely free of mechanical load during each open contact period. It is therefore adapted for responding to very slight ambient temperature changes.

FIG. 12 illustrates a modified form of ambient compensated thermostatic element which provides positive thermal feedback. As shown, the element 70 includes an ambient compensated leg 71 adjacent to the copy leg 72. A thin reversed bimetal tip 73 is affixed to the free end of leg 72. This change from the element 30 of FIGS. 2, 3 and 8 positions the ambient compensating leg thermally proximate the copy leg thereby enabling the former leg 71 to integrate the average wattage in the copy blade and so provide automatic reset. The increased flexing of blade 71 increases the ON time of the copy blade 72 as the demand increases. The compensating blade senses this increased heat and moves to further increase the cycling ON time, thus serving as positive feed-back or automatic reset as a function of the demand.

An additional embodiment of the present invention is illustrated in FIGS. 9 and 10, this embodiment employing an ambient compensated element of different configuration than in the embodiments described hereinabove. Referring now to FIG. 9, the ambient sensing element 75 is cantilever mounted with one end firmly affixed to the base 76 of the housing. The ambient compensated element 77 is of the type disclosed and claimed by this inventor in his copending application entitled "Ambient Compensated Bimetal Elements," Serial No. 262,083 filed March 1, 1963 and assigned to Robertshaw Controls Company. This element comprises generally a Z-shaped bimetal element having a generally U-shaped slit forming an inner extending tongue or leg 78 and a supporting base 79. Base 79 is preferably affixed to a spring-pivoted base member 80 having an extending lever arm 81 biased in the downward direction to maintain mechanical contact with the adjusting cam 82. A reversed thin bimetal segment 85 is affixed to the extending leg 78 by welding or other suitable means and the resulting bimetal member preferentially heated by a resistance winding 86. As in the foregoing described embodiment, more turns per unit length of the resistance wire are wound upon the tip 85 than upon the leg 78 of the ambient compensated member.

Respective electrical contacts 90, 91 are carried by the ambient sensor 75 and bimetal tip 85, contact 91 being electrically connected to one end of the electrical resistance wire 86. The other end 92 of this resistance wire and lead 93 connected to the ambient sensor 75 constitute the output terminals of the modulating thermostat.

The embodiment of FIGS. 9 and 10 functions in a manner substantially similar to the previously described embodiment with, however, the difference that the set temperature is obtained by physically moving the ambient compensated element upwards or downwards rather than the ambient sensing element. The generated output signal, however, is the same since it depends only upon the position of the ambient sensor relative to the cycling bimetal element.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A modulating thermostat for supplying a variable electrical signal proportional to the difference between the existing ambient temperature and the desired control temperature including in combination:
   a thermostatic element for sensing ambient air temperature comprising a corrugated bimetallic member supported at one end and having an electrical contact at the other end thereof;
   an ambient compensated thermostatic element including a cycling bimetal element having a preferentially heated portion, said portion including a relatively slow temperature responsive bimetal segment and a relatively fast temperature responsive bimetal segment, said segments being flexed in respectively opposite directions when preferentially heated;
   a switch contact carried by the fast temperature responsive segment of said ambient compensated element;
   an electrical heater means located proximate to both said slow temperature responsive bimetal segment and said fast temperature responsive bimetal segment of said ambient compensated element for providing said preferential heating; and
   electrical circuit means for energizing said heater including said switch contact carried by said ambient sensing element and said contact carried by the fast temperature responsive segment of said ambient compensated element, said fast temperature responsive segment flexing the switch contact which it carries toward said other contact when said contacts close and energize said heater to provide increased contact closure when said contacts are closed, said fast temperature responsive segment flexing the switch contact which it carries away from said other contact when said contacts open and de-energize said heater to provide increased contact gap when said contacts are open.

2. The modulating thermostat defined in claim 1 wherein:
   said preferentially heated portion of said ambient compensated element comprises a relatively elongated bimetal leg and said relatively fast responding segment comprises a short, thin bimetal member affixed to one end of said elongated member in reversed juxtaposition.

3. The modulating thermostat defined in claim 1 wherein:
   said electrical heater supplies more heat to said relatively fast responding segment than to said relatively slow responding segment.

4. The modulating thermostat defined in claim 3 wherein:
   said electrical heater comprises an insulated resistance wire wound upon said slow and fast acting segments of said ambient compensated element and having more turns per unit length wound upon said fast responding segment than upon said slow responding segment.

5. A modulating thermostat for supplying a variable electrical signal proportional to the difference between the existing ambient temperature and the desired control temperature comprising in combination:
   a first thermostatic element for sensing ambient air temperatures;
   a second thermostatic element including relatively slow and relatively fast temperature responsive thermostatic portions flexing in respectively opposite directions upon application of preferential heating;
   an electrical heater means thermally associated with both said relatively slow and said relatively fast temperature responsive thermostatic portions of said second thermostatic element for supplying said preferential heating; and
   electrical circuit means for energizing said heater including switch contacts respectively carried by said first thermostatic element and said fast temperature responsive thermostatic portion of said second thermostatic element, said fast temperature responsive portion flexing the switch contact which it carries toward said other contact when said contacts close and energize said heater to provide increased contact closure when said contacts are closed, said fast temperature responsive portion flexing the switch contact which it carries away from said other contact when said contacts open and de-energize said heater to provide increased contact gap when said contacts are open.

6. The modulating thermostat defined in claim 5 wherein:
   said first thermostatic element comprises a corrugated bimetal configuration.

7. The modulating thermostat defined in claim 5 wherein:
   said first thermostatic element comprises a cantilever mounted bimetal member having one of said switch contacts affixed to the end opposite its supported end.

8. The modulating thermostat defined in claim 7 wherein:
   said ambient sensing bimetal has its mounting end fixed to a spring pivoted base member biased against a temperature adjusting cam.

9. The modulating thermostat defined in claim 7 wherein:
   said ambient sensing bimetal element has its mounting end fixedly attached to the base of said thermostat.

10. The modulating thermostat defined in claim 5 wherein:
    said second thermostatic element comprises
      a generally U-shaped ambient compensated bimetal member having two legs and a connecting section, one of said legs having one end fixedly mounted to the base of said thermostat and
      a thin bimetal tip affixed to the end of said other leg and having its member of higher temperature coefficient of expansion located upon the side opposite the corresponding member of said leg.

11. The modulating thermostat defined in claim 5 wherein:
    said second thermostatic element comprises a bimetal element bent in a generally Z-shape with a generally U-shaped slit forming an inner leg, said inner leg comprising a preferentially heated portion of an ambient compensated element.

12. The modulating thermostat defined in claim 11 wherein:
    the base of said Z-shaped bimetal element is fixedly mounted to a spring pivoted base member biased against a temperature adjusting cam.

13. The modulating thermostat defined in claim 5 wherein:
the preferentially heated portion of said ambient compensated thermostatic element comprises an elongated bimetal member having affixed thereto a short, thin bimetal tip having its member of greater temperature coefficient of expansion in a position opposite the corresponding member of said elongated member.

14. The modulating thermostat defined in claim 5 wherein:
said electrical heater supplies more heat to said relatively fast temperature responsive portion than to said relatively slow temperature responsive portion.

15. The modulating thermostat defined in claim 14 wherein:
said electrical heater comprises an insulated resistance wire wound upon said slow and fast acting portions of said second thermostatic element and having more turns per unit length wound upon said fast responding segment than upon said slow responding segment.

16. The modulating thermostat defined in claim 5 comprising:
means for increasing the convection circulation of ambient air through the thermostat including a vertical heat shield proximate said electrical heater and forming in combination with the housing of the modulating thermostat a vertical chamber around said electrical heater.

17. The modulating thermostat defined in claim 5 wherein:
said second thermostatic element comprises an ambient compensating leg and a thermally proximate copy leg, the said ambient compensating leg integrating the average wattage in said copy blade.

18. The modulating thermostat defined in claim 5 wherein:
said second thermostatic element provides positive thermal feedback for effecting automatic reset as a function of demand.

References Cited by the Examiner

UNITED STATES PATENTS

| | | | |
|---|---|---|---|
| 2,306,810 | 12/1942 | Jones | 200—138 |
| 2,366,387 | 1/1945 | Crise | 200—138 |
| 2,881,300 | 4/1959 | Schwaneke | 200—138 X |
| 2,913,563 | 11/1959 | Schmall et al. | 200—113 X |
| 3,046,375 | 7/1962 | Houser | 200—122 X |
| 3,084,237 | 4/1963 | Mentzer | 200—138 X |

BERNARD A. GILHEANY, *Primary Examiner.*

L. A. WRIGHT, *Assistant Examiner.*